United States Patent
Kirla, Jr.

(10) Patent No.: US 6,887,028 B1
(45) Date of Patent: May 3, 2005

(54) RAMP-RACK FOR A TRUCK OR OTHER TRANSPORT VEHICLE

(76) Inventor: Stanley J. Kirla, Jr., Box 956, Deep River, CT (US) 06417

( * ) Notice: Subject to any disclaimer, the term of this patent is extended or adjusted under 35 U.S.C. 154(b) by 0 days.

(21) Appl. No.: 10/617,594

(22) Filed: Jul. 11, 2003

(51) Int. Cl.[7] .............................................. B65G 67/02
(52) U.S. Cl. ........................ 414/537; 14/69.5; 14/71.1; 296/61
(58) Field of Search ........................ 414/537; 14/69.5, 14/71.1; 296/61

(56) References Cited

U.S. PATENT DOCUMENTS

| | | | | |
|---|---|---|---|---|
| 3,989,148 | A | * 11/1976 | Donohue | 414/537 |
| 4,098,414 | A | * 7/1978 | Abiera | 414/537 |
| 5,645,394 | A | * 7/1997 | Hays | 414/537 |
| 5,938,397 | A | * 8/1999 | Schouest | 414/537 |
| 6,158,798 | A | * 12/2000 | Stedtfeld et al. | 269/61 |
| 6,345,950 | B1 | * 2/2002 | Gerwitz | 414/537 |
| 6,725,487 | B2 | * 4/2004 | Myrick et al. | 14/69.5 |
| 2002/0088065 | A1 | * 7/2002 | Schmaltz et al. | 14/69.5 |
| 2003/0213072 | A1 | * 11/2003 | Myrick et al. | 14/69.5 |
| 2004/0083562 | A1 | * 5/2004 | Leblanc | 14/69.5 |

OTHER PUBLICATIONS

Catalog No. 668c–11, J.C. Whitney Co., Lasalle, IL (2002) p. 49.

* cited by examiner

Primary Examiner—Eileen D. Lillis
Assistant Examiner—Mark A. Deuble
(74) Attorney, Agent, or Firm—C. Nessler (57) ABSTRACT

A device called a ramp-rack may be used as a rack for the body of a stake body truck in a first mode, and as a ramp in a second mode, for rolling equipment between the bed and the ground. The ramp-rack may be hinged, so when used as a ramp, it will be longer than when used as a rack. Two or more ramp racks may be stacked, when they are used as a rack on the bed of a truck.

10 Claims, 6 Drawing Sheets

RAMP-RACK FOR A TRUCK OR OTHER TRANSPORT VEHICLE

TECHNICAL FIELD

The present invention relates to accessories for transport vehicles, in particular to side racks for truck bodies, which racks are removable to become ramps, for rolling things from the ground, up onto the truck body.

BACKGROUND

The present invention is applicable to rack body trucks, and other vehicles which have features like such trucks. In a typical rack body truck, the flat bed of the truck, for carrying things, is enclosed by railings, or racks. Typically, each rack is held in place by downward protruding members, or stakes, which insert into pockets spaced apart along the edge of the bed. If desired, the racks may be lifted up and removed, to create a totally accessible flat bed. Typically, racks at least run along opposing sides of the bed, in the front-back direction. Sometimes, there is a rack running sideways across the rear or tail end of the bed, so the total rack assembly runs in the shape of a U. The forward portion of the bed may be only bounded by the rear portion of the cab; or, there may be another fence or rack which is often not readily removable, so the rack will define a rectangular enclosure. A rack running along the edge of a bed may often be segmented into separate units, for convenience in handling.

Typically, the bed of a flat bed truck is substantially raised above the ground, since it extends outwardly over the rear wheels of the vehicle. And, often things have to be put on the bed from the ground surface on which the vehicle rests. In such situations, one common way of moving heavy objects to or from the bed, particularly objects which have wheels, is to roll them up or down sloped ramps. Typically, the ramps run parallel to the vehicle length, out and downwardly, from the rear edge of the bed. Ramps are usually used as pairs, are made of metal, such as steel or aluminum, and have continuous or perforated working surfaces. Ramps must be sufficiently long, to make the angle from the horizontal slight enough, so excess force is not necessary for pushing or for restraining an object moving along the ramp, and to make it feasible for a self-powered vehicle to move up the ramp. For flexibility, it is desirable to be able to change the spacing between the pieces of a ramp pair, to accommodate different width vehicles or objects being carried. Obviously, ramps can be and are used for sliding as well as rolling of objects onto or off of a bed.

It is common that ramps have to be stowed and carried on the vehicle, so they are available at the remote locations, for loading or discharge. Of course, if the body design permits, a special stowing location can be configured under the bed. It is more usual to simply stow the ramps on the bed with the cargo, by laying them alongside one or both racks or on top of the cargo. Of course, when doing that, they take up cargo space. Alternately, ramps may be hung from the exterior of one or both racks. But, that expands the width of truckand puts the ramps in a location where they are more vulnerable to damage.

SUMMARY OF THE INVENTION

An object of the invention is to provide ramps for rack body flat bed trucks and other transport vehicles, which ramps are strong, durable, easy to store, easy to carry on a rack body truck, and economic to manufacture.

In accord with the invention an article, called a ramp-rack is useful in two ways, first as a ramp, and second as a rack, with the bed of a rack body truck of other transport vehicle, which bed has pockets for receiving stakes. The ramp-rack has a lengthwise extending body with a working surface, for supporting objects moving to or from the ground to said bed, when the ramp-rack is used in the first mode as a ramp. The ramp-rack has at least one stake, more typically two or more stakes, projecting transversely an one edge of the body, so when the stakes are inserted into pockets of the bed, the ramp-rack is held vertically in place along the length of the bed. The ramp-rack has at least a first end which is shaped to engage an edge of the bed, when the ramp-rack is used as a downward sloping ramp. Preferably the edge runs at a greater than 180 degree angle to the plane of the working surface of the ramp-rack which is adjacent the end; and preferably means, such as pins or tabs are used to temporarily fasten the ramp-rack to the edge of the bed so it does not fall off.

In preferred embodiment the ramp-rack has a hinge or other folding means located along its length, so that the ramp-rack may be folded when used as a rack and unfolded when used as a ramp, so the length of the ramp may be longer than the length of the edge of the bed which is bounded by the ramp-rack used in the rack mode. In a further variation, a ramp-rack has pockets on the edge opposing the edge from which the stakes project, to receive stakes for other uses or to receive the stakes of a like ramp-rack, and thus to expand the functional height of a single ramp-rack. The stakes may have tapered ends and resilient material on one or more tapered surface, to better engage pockets. The ramp-rack preferably have continuous planar surfaces bounded by opposing edge curbs.

The foregoing and other objects, features and advantages of the invention will become more apparent from the following description of preferred embodiments and accompanying drawings.

DESCRIPTION

With reference to the Background above, the invention is described in terms of its application to a common flat bed truck. The invention may be used with other transport vehicles, including other style truck bodies, trailers, and any vehicle having pockets for stakes. The invention is referred to as a ramp-rack because it serves the dual selective purpose of being either a rack or a ramp.

Figure 1:
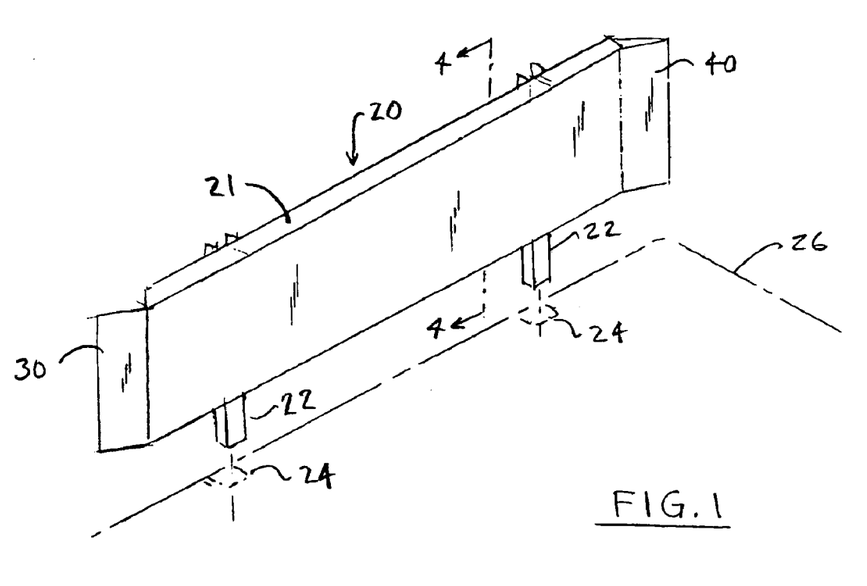
FIG. 1 is isometric view of a ramp-rack having a continuous surface, and illustrates how stakes of the ramp-rack insert into the pockets of a bed of a truck, when the article is used as a rack.

FIG. 1 is a perspective view of one of the inventive ramp-racks 20, indicating how two spaced apart stakes 22 of the ramp-rack insert into the pockets 22 commonly found at the top edge of a truck bed 26, shown in phantom, so the ramp-rack serves as a rack. The ramp-rack is of a strong but lightweight construction, such as welded and or riveted medium gage aluminum alloy No. 6061T6 or the like; and, it has a skid resistant working surface, described further below.

Figure 2:
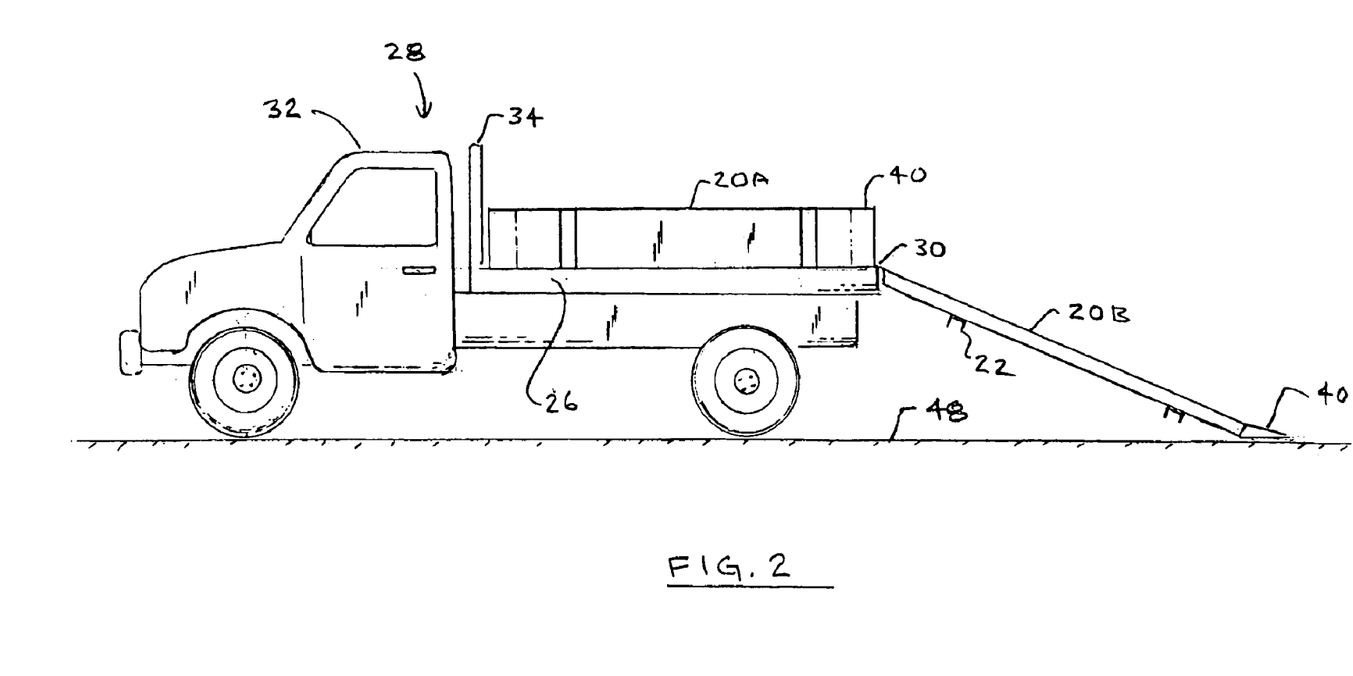
FIG. 2 is a side elevation view of a truck showing how a ramp-rack is used as a ramp running downwardly from the bed of the truck.

FIG. 2 is a side elevation view of a small rack body truck 28 having a cab 32. It shows one ramp-rack 20A of the invention, when it is in place as a rack, to serve a first mode or function. The ramp-rack 20A stands on edge, with the stakes engaged with the pockets of the truck body. The ramp-rack will contain loose cargo placed on the bed, and otherwise function as a common rack. FIG. 2 shows another ramp-rack identical rack 20B, which is positioned so it extends downwardly from the rear end of the truck bed, to the ground. It thus serves in a second mode, as a ramp having a sloped working surface along which objects can move between the bed and the ground. The ramp-rack may be used as ramp from the side of the bed if desired.

Figure 3:
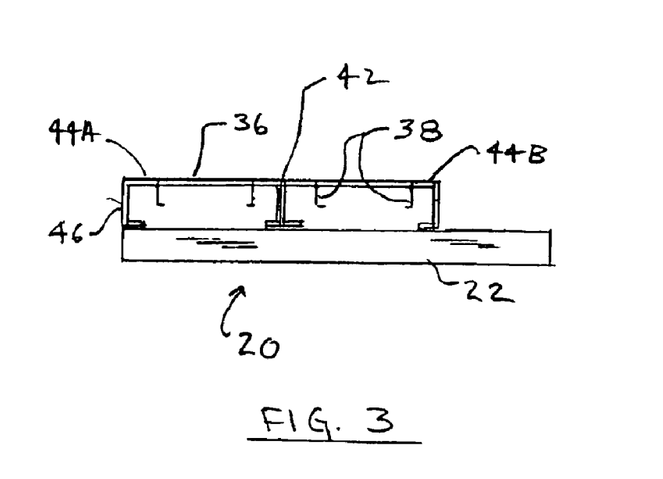
FIG. 3 is an end view of a ramp-rack, showing structural features.

FIG. 3 shows the cross section of a typical welded aluminum ramp-rack. The main portion of the body 21 is comprised of two channels 44A and 44B, fastened to each other at ramp-rack lengthwise centerline 42. Running along the length of the C-shape of each channel (that is, along the underside of the working surface 36 of the ramp-rack) are two spaced apart angles 38, which enhance the lengthwise bending strength of the ramp-rack. Other cross sections of ramps may be used, including those that are non-uniform along the length. Generally, any structural design suited for fabricated metal beams may be employed in ramp-racks.

Stake 22 is welded to the several downwardly extending flanges 46 of the channels, so it runs transverse to the length of the working surface. There are two stakes 22 in the exemplary ramp-rack. More may be utilized, consistent with the construction of the truck bed. Each stake 22 is welded to the opposing side flanges of the channels, so it provides further bending strength by tying the flanges together, so the point of onset of buckling under extreme load is raised. The working surface 36 of the ramp-rack is preferably textured or finished for use with self-powered vehicles. For example, the surface 36 will be continuous from one end to the other, but fined with a multiplicity of perforated embossed bosses. Or, it may have other familiar known embossing, such as characterizes common diamond plate; or, the surface may comprise a rough material or coating, for example, having a character similar to coarse abrasive paper. Obviously, when the ramp-rack is to be used for sliding objects it will be fitted with a smooth, and even anti-friction surface.

Figure 4:
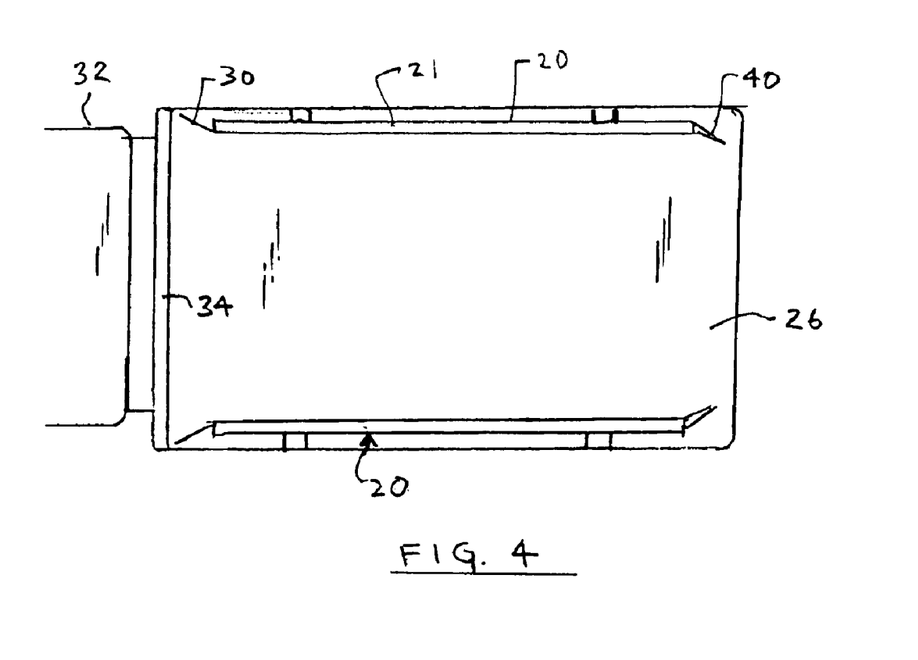
FIG. 4 is a top view of the bed of the truck shown in FIG. 2, with two ramp-racks in place, to function as opposing side racks.

FIG. 4 is a top view of the rear portion of the truck of FIG. 1, showing how two opposing side ramp-racks 20, form an enclosure for containing cargo in cooperation with a fixed headboard 34, which acts as a fence to protect the rear of the cab. In other embodiments, a ramp-rack may be mounted so the end 40 is toward the front of the vehicle. In FIG. 4, another removable ramp-rack or a conventional rack, running across the rear, can be envisioned, so the removable staked pieces cooperate to form a U-shape enclosure.

Referring again to FIGS. 1 and 2, the opposing ends of the ramp-rack are comprised of bottom end lip 40 and upper end lip 30. The upper surface of lip 40 is angled to the length of the ramp-rack body 21, at an angle of less than 180 degrees, so that there is a smoother transition with the surface 48 of the ground, than there would be in its absence. If the surface 36 of the body is curved the angle between the lip and body will be measured relative to the portion of working surface 26 near the end.

Figures 5, 6:
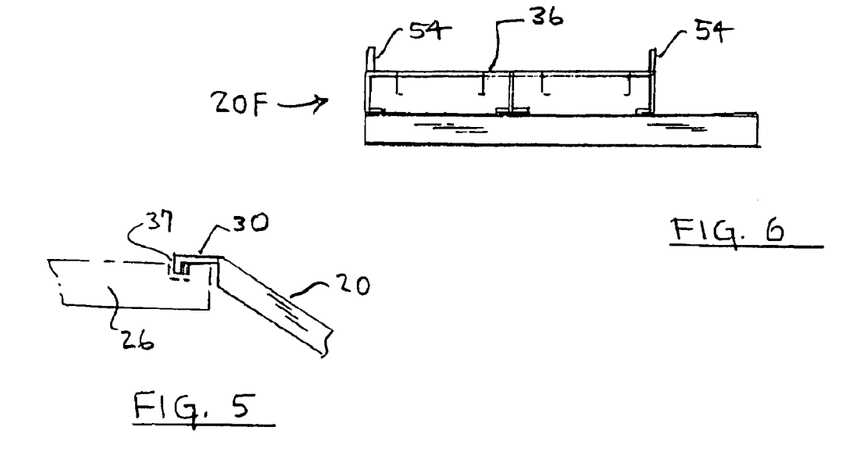
FIG. 5 is shows how a ramp-rack engages the edge of the bed of a truck when it is positioned as a ramp, as illustrated in FIG. 2.
FIG. 6 is a view like FIG. 3, showing curbs running along opposing edges of the ramp-rack.

The upper end lip 30 is configured to lie on and engage with the surface of the bed, so the upper end of the ramp-rack is supported when it is used as a ramp. The surface of the end 30 runs at a more than 180 angle, preferably, from the surface of the main portion of the body 21. The angle will be measured relative to the nearest portion of the working surface 36 of the body, when the working surface is curved, as mentioned for lip 40. In one embodiment, the lip 30 simply lays on the bed. In another embodiment, flange 37 or a pin projects downwardly from the lip, as shown in FIG. 5, to engage a depression or other feature at the rear edge of the bed. Means, such as pins or bolts, not shown, may be used to detachably fasten the upper lip to the bed, or to substitute for the lip in engaging the upper end of the ramp-rack with the bed in a way not prone to inadvertent disconnection. The upper end or lower end lips may be made with a more complex multi-angled or curved configuration, than has been shown, to provide a smoother transition in slope. Although much preferred, the end lips, especially lip 40, may be eliminated in the generality of the invention.

With reference to the top view in FIG. 4, when the preferred ramp-rack 20 is in place as a rack on the bed of a truck, the rear lip 40 desirably provides, in a small way, some capability for retaining goods on the bed against the tendency to fall off the rear end. And, both end lips provide a little resistance to sideways bending of the ramp-rack in supplement to the stake, when the configuration of the ramp-rack stakes enables the lips to touch the surface of the bed.

FIG. 6 is generally like FIG. 3, and illustrates opposing side curbs 54 which extend upwardly from the working surface 36, so that wheeled vehicles running along the ramp-rack 20F will be inhibited from running off the ramps. Alternately, curbs may be roll formed into sheet metal rack-ramp bodies.

Figure 7:
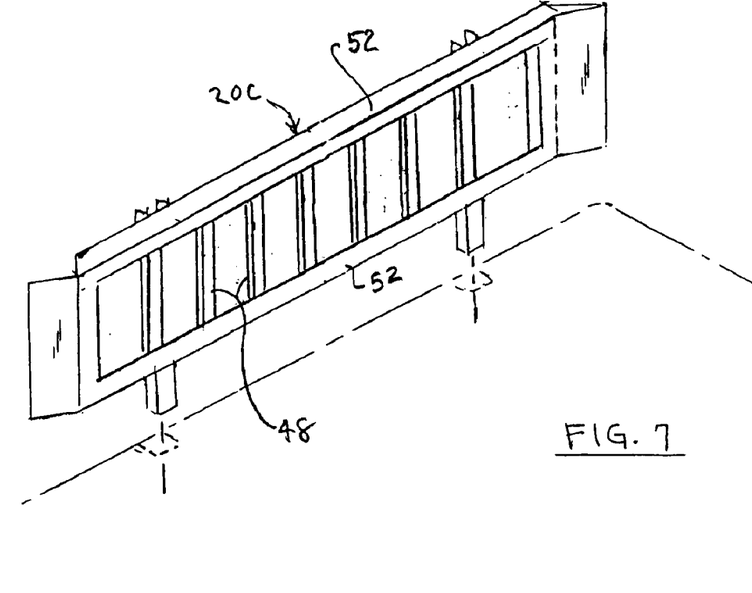
FIG. 7 is a view like FIG. 1, showing a ramp-rack having spaced apart beams in substitution of a continuous surface.

FIG. 7 shows another invention embodiment, ramp-rack 20C, which has a discontinuous working surface of ladder like construction. The working surface 36 is comprised of spaced apart struts 48 running cross-wise, to connect opposing side lengthwise angles or channels 52. Such a ramp-rack may be employed as a somewhat crude ladder, if desired.

Figure 8:
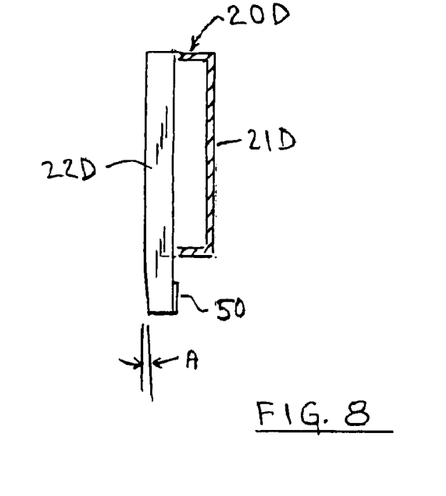
FIG. 8 is an end view like FIG. 3, shows a simple channel cross section body, and a stake having an end which is tapered and surfaced with resilient material.
Figure 9:
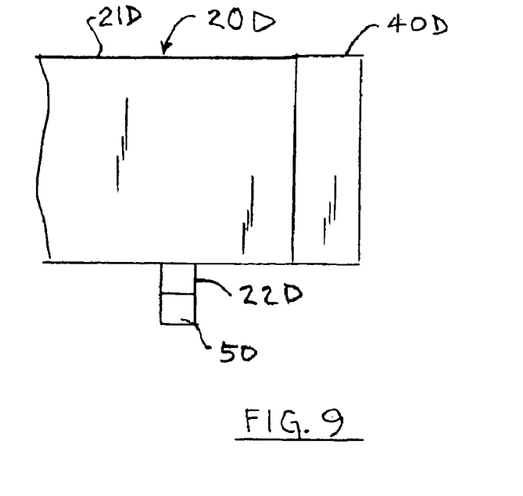
FIG. 9 is a side elevation view of a portion of the ramp-rack of FIG. 8.

FIGS. 8 and 9 show other aspects of a ramp-rack. The ramp-rack 20D has a simple channel cross section, as a substitute to the cross section previously described. FIG. 8 shows a stake 22D having a lower end tapered at angle A, so that the extreme lower end is smaller in thickness than the inboard portions thereof. Thus, when stake 22D is inserted into the truck bed pocket, there is a wedging fit. Stake 22D also has a hard rubber pad 40 which cooperates with the wedging action, to more firmly and resiliently engage the interior of the bed pocket. Both features tend to inhibit rattling of the ramp-rack, and tend to enhance the soundness of mounting. Other known means for retaining stakes in pockets and racks on trucks may be employed with the invention.

Figure 10:
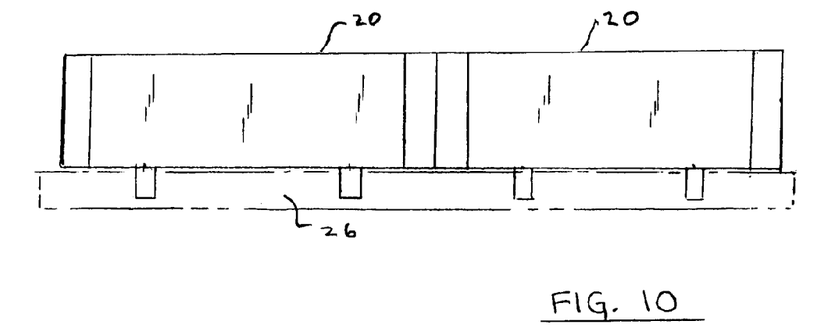
FIG. 10 is a side elevation showing two abutted ramp-rack installed on a truck bed.

FIG. 10 is a side elevation view of two ramp-rack 20, mated together end to end, as they would be when installed in adjacent sets of pockets running along the side of bed 26, shown in phantom. Thus, a long length rack is formed of short length ramps. Means may be provided for attaching the lips of the mated racks where they come together.

Figure 11:
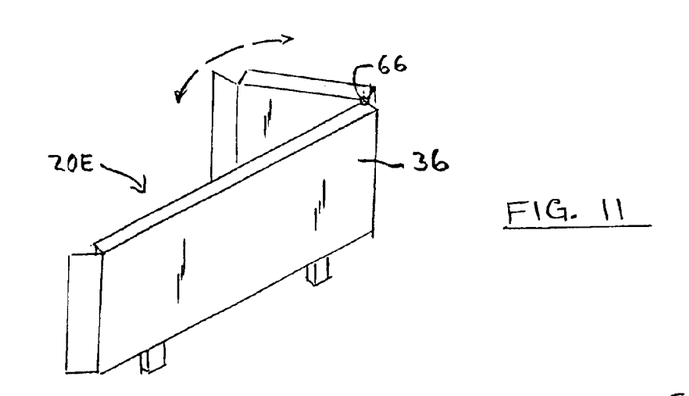
FIG. 11 shows a hinged ramp-rack, with the two portions running at right angles.

FIG. 11 shows an embodiment of ramp-rack 20E, which is hinged at a point along its length, so it can fold upon itself. Thus, when it is used as a rack it may be of shorter length than when it is used as a ramp. The hinge 66 may be placed at any point along the length. The hinging of ramp-rack 20E is such that, when the ramp is loaded, the hinge 66 is under tension. Less desirably, the ramp will rotate in the opposing direction, so the hinge in the ramp configuration is under compression, and latches and locking members will be used to lock the hinge joint against opening when the ramp is loaded. When installed as a rack, the hinged portion of ramp-rack 20E may run at a 90-degree angle to the length of the truck bed, so that the hinged portion will function as part or all of a tail end rack. Other known means may be substituted for the hinge, to achieve the same functional result, including means for separating and re-fastening the two portions of a ramp-rack, such as one or more pins or latches.

Figure 12:
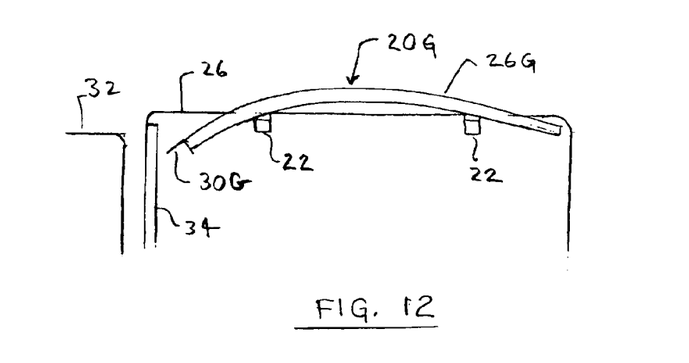
FIG. 12 is a partial top view of a truck bed, similar to FIG. 4, showing a curved ramp-rack.

Preferably, the ramp-rack body is preponderantly straight and the working surface is essentially planar, as has been described for ramp-rack 20. FIG. 12 shows curved ramp-rack 20G, as it looks from above when mounted on the bed 26. The curve lessens the sharpness of transition at the point where the ramp-rack attaches to the bed, when being used as a ramp. In this embodiment, the working surface 26G faces outwardly when the ramp-rack is mounted as a rack.

Figure 13:
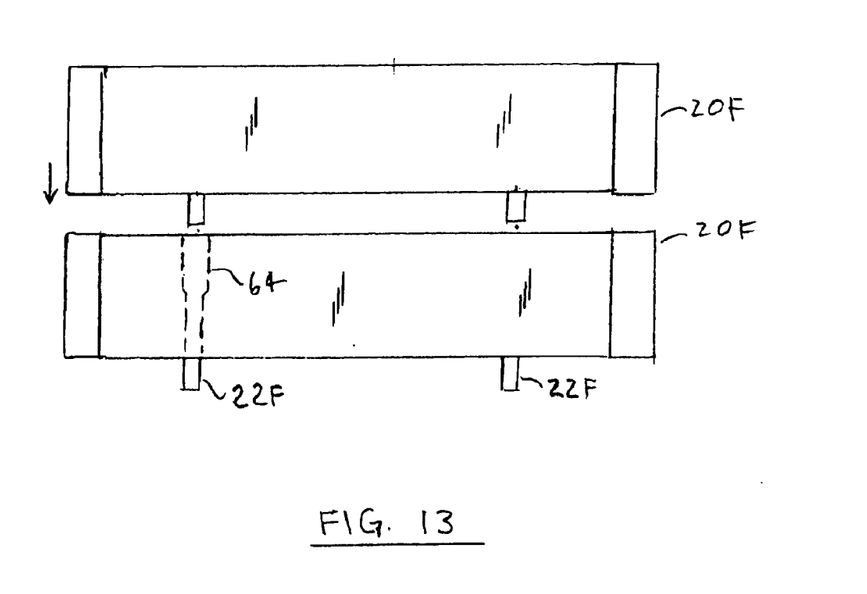
FIG. 13 is a side elevation view showing how the stakes of a second ramp-rack are receivable in pockets of a first ramp-rack, to form an extended height ramp-rack.

FIG. 13 shows ramp-rack 20F, which is like ramp-rack 20, but is fitted with pockets 64, to receive stakes along the edge opposite that from which the ends of stakes 22F project. Stakes of a conventional rack, or of an identical rack, as shown in the Figure, may be mounted in the pockets 64, to increase the height of cargo containment of the lower ramp-rack. Alternately stakes may be used to support a cover or a signboard. Preferably, as shown, the pockets are integral with the upper ends of the stakes 22F, and both racks are similar. Fastening means may be used to hold the two ramp-racks together when in use. Thus the bottom ramp-rack inserts into the bed and the top ramp-rack inserts into it. In such case, the top ramp-rack can have stakes, etc., projecting upwardly from its pockets.

While the preferred design of ramp-rack has two stakes, more stakes may be used. Alternatively, only one stake may be used, such as when one end of the ramp-rack is attached to the headboard 34 of the vehicle and only the rear end has a stake.

Some trucks have integral sidewalls, as for instance is the case with a common pickup truck or a dump body truck. Typically, the sidewalls of such vehicles are provided with pockets to receive stakes, just as the flat bed of a rack body truck is. The inventive ramp-racks may be used with such kinds of vehicles. While ramps have been described as running off the rear end of a truck, they may run off the sides, as well.

Although this invention has been shown and described with respect to a preferred embodiment, it will be understood by those skilled in this art that various changes in form and detail thereof may be made without departing from the spirit and scope of the claimed invention.

I claim:

1. A ramp-rack article, for use in combination with the bed of a transport vehicle, in a first mode as a downward sloping ramp to the ground on which the vehicle rests, and in second mode as a rack for containing cargo resting on the bed, wherein said bed has pockets along an edge for receiving two or more spaced apart stakes, which comprises:
   a lengthwise extending article body having a first end shaped to engage an edge of said vehicle bed, a second end for contacting said ground, a working surface for supporting objects moving to or from the first to the second end, when the ramp-rack article is used in the first mode as a ramp; and,
   at least two spaced apart stakes projecting transversely from one edge of the body, so the ramp-rack may be held vertically in place along the edge of said vehicle bed, when the ramp-rack article is used in the second mode as a rack;
   the body having at least two spaced apart pockets, located along the side of the body which is opposite the side from which the stakes project, for receiving a stakes of a second like ramp rack article when the ramp-rack is used in said second mode.

2. The ramp-rack of claim 1, wherein the body has a second end segment with a surface running at an angle to the plane of said working surface in vicinity of the second end.

3. The ramp-rack of claim 1, wherein the first end has a segment with a surface running at an angle of greater than 180 degrees to the adjacent portion of the working surface.

4. The ramp-rack of claim 1, further comprising means for temporarily attaching the first end to the edge of the bed, when the ramp-rack is used in said first mode.

5. The ramp-rack of claim 1, further comprising means, located along the length of the body, for enabling the ramp-rack to fold upon itself.

6. The ramp-rack of claim 1 wherein the whole working surface is planar and generally continuous.

7. The ramp-rack of claim 1 wherein the working surface is comprised of spaced apart beams.

8. The ramp-rack of claim 1 further comprising two curbs, projecting upward from the working surface, one each running lengthwise along each opposing edge of the ramp-rack, for inhibiting a wheeled object moving along the ramp-rack in the first mode from running off the edge thereof.

9. A ramp-rack article, for use in combination with the bed of a transport vehicle, in a first mode as a downward sloping ramp to the ground on which the vehicle rests, and in second mode as a rack for containing cargo resting on the bed, wherein said bed has pockets along an edge for receiving two or more spaced apart stakes, which comprises:
   a lengthwise extending article body having a first end shaped to engage an edge of said vehicle bed, a second end for contacting said ground, and a working surface for supporting objects moving to or from the first to the second end, when the ramp-rack article is used in the first mode as a ramp; and,
   at least two spaced apart stakes projecting transversely from said at least one edge of the body, so the ramp-rack may be held vertically in place along the edge of said bed, when the ramp-rack article is used in the second mode as a rack; wherein the end of at least one of said stakes is tapered and surfaced with a resilient material, for contacting the interior of a pocket in wedging fashion.

10. The ramp-rack of claim 9, wherein the working surface of the body is an essentially planar surface; further comprising: an end segment of the body running at an angle to the adjacent portion of the working surface, for contacting the ground or resting on said edge; means for temporarily attaching the first end to the edge of the bed, when the ramp-rack is used in said first mode; and means, located along the length of the body, for enabling the ramp-rack to fold upon itself.

* * * * *